United States Patent
Zhang et al.

(10) Patent No.: US 10,187,329 B2
(45) Date of Patent: Jan. 22, 2019

(54) METHOD AND APPARATUS FOR PROCESSING NETWORK PROTOCOL STACK DATA

(71) Applicant: Huawei Technologies Co., Ltd., Shenzhen, Guangdong (CN)

(72) Inventors: Wei Zhang, Shanghai (CN); Wei Zhang, Shanghai (CN); Chenghui Peng, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 91 days.

(21) Appl. No.: 15/356,463

(22) Filed: Nov. 18, 2016

(65) Prior Publication Data
US 2017/0070455 A1    Mar. 9, 2017

Related U.S. Application Data

(63) Continuation of application No. PCT/CN2014/077990, filed on May 21, 2014.

(51) Int. Cl.
*H04L 12/931* (2013.01)
*H04L 29/12* (2006.01)
(Continued)

(52) U.S. Cl.
CPC .............. *H04L 49/70* (2013.01); *H04L 29/08* (2013.01); *H04L 61/2007* (2013.01);
(Continued)

(58) Field of Classification Search
CPC ....... H04L 45/00; H04L 47/10; H04L 49/351; H04L 29/0653; H04L 29/06
See application file for complete search history.

(56) References Cited

U.S. PATENT DOCUMENTS 5,940,390 A * 8/1999 Berl .................... H04L 12/4604
                                                        370/389
7,359,380 B1 * 4/2008 Maufer ................. H04L 45/16
                                                        370/389
(Continued)

FOREIGN PATENT DOCUMENTS

CN        101785280 A    7/2010
CN        102090087 A    6/2011
(Continued)

*Primary Examiner* — Gbemileke J Onamuti
*Assistant Examiner* — Sanjay K Dewan

(57) ABSTRACT

The present disclosure discloses a method and apparatus for processing network protocol stack data. The method includes: extracting, from a to-be-processed data packet, an identifier used to indicate a data flow to which the to-be-processed data packet belongs; when a pre-generated rule matching table includes the identifier, processing, according to a protocol-stack layer jump processing policy that is corresponding to the identifier and that is in the rule matching table, the to-be-processed data packet on a target layer indicated by the protocol-stack layer jump processing policy. By using the method and apparatus in the present disclosure, unnecessary processing may not be performed on some data packets that do not need to be processed on all protocol-stack layers, so as to reduce or even avoid unnecessary consumption of computing resources and transmission resources.

14 Claims, 7 Drawing Sheets

(51) Int. Cl.
H04L 29/06 (2006.01)
H04L 29/08 (2006.01)

(52) U.S. Cl.
CPC ........ H04L 61/6022 (2013.01); H04L 67/146 (2013.01); H04L 69/16 (2013.01); H04L 69/22 (2013.01)

(56) References Cited

U.S. PATENT DOCUMENTS

| | | | | |
|---|---|---|---|---|
| 8,315,243 | B2* | 11/2012 | Meylan | H04W 80/02 370/349 |
| 8,468,427 | B2* | 6/2013 | Schedelbeck | H04L 1/0083 370/231 |
| 8,817,636 | B2* | 8/2014 | Song | H04L 1/0045 370/249 |
| 2005/0135357 | A1* | 6/2005 | Riegel | H04L 45/00 370/389 |
| 2007/0223472 | A1* | 9/2007 | Tachibana | H04L 47/10 370/389 |

FOREIGN PATENT DOCUMENTS

| | | |
|---|---|---|
| CN | 102694727 A | 9/2012 |
| CN | 103327639 A | 9/2013 |

* cited by examiner

METHOD AND APPARATUS FOR PROCESSING NETWORK PROTOCOL STACK DATA

CROSS-REFERENCE TO RELATED APPLICATIONS

This application is a continuation of International Application No. PCT/CN2014/077990, filed on May 21, 2014, the disclosure of which is hereby incorporated by reference in its entirety.

TECHNICAL FIELD

The present disclosure relates to the field of wireless network communications technologies, and in particular, to a method and apparatus for processing network protocol stack data.

BACKGROUND

Currently, a concept of an SDN (Software Defined Network) is quite popular. A main feature of the SDN is that a control plane is separated from a data plane, and control planes of different devices are centralized, and are centrally controlled by using a centralized control device, so as to achieve an objective of improving overall resource utilization by means of centralized control. Further, a capability is further exposed to an upper level (for example, a content provider). Currently, an SDN technology is mainly applied to an IP transmission network, and is reflected as centralized control on data packet routes in the IP transmission network. According to data statistics, bandwidth utilization of a data center may be efficiently improved from originally 30% to 90% by means of centralized control.

In an LTE (Long Term Evolution) wireless network, a user plane protocol stack that is on an air interface side and that is between an eNB and UE includes three sub-layers: a PDCP (Packet Data Convergence Protocol) layer, an RLC (Radio Link control) layer, and a MAC (Medium Access Control) layer. In the foregoing user plane protocol stack, the RLC layer is mainly responsible for reliability of data packet transmission on the air interface side, and has functions such as reordering out-of-order data packets, and the PDCP layer has functions such as performing security encryption/decryption and header compressing on the data packets.

On the air interface side, all user plane data packets need to undergo the same protocol stack processing by the eNB and the UE, that is, all the user plane data packets need to be processed on a PDCP layer, an RLC layer, and a MAC layer.

During study of the prior art, the inventor of the present disclosure finds that: In some applications, data packets on a user plane feature a small data volume, for example, data packets in an M2M application. However, in the prior art, a waste of resources is relatively severe in a process of transmitting these small data packets.

SUMMARY

In view of this, the present disclosure provides a method and apparatus for processing network protocol stack data, so as to resolve a problem that too many transmission resources are consumed for user plane data packets of some types of applications in the prior art. Specific solutions are as follows:

According to a first possible implementation manner of a first aspect of the present application, the present application provides a method for processing network protocol stack data, where the method includes:

extracting, from a to-be-processed data packet, an identifier used to indicate a data flow to which the to-be-processed data packet belongs;

detecting whether a pre-generated rule matching table includes the identifier; and when the rule matching table includes the identifier, processing, according to a protocol-stack layer jump processing policy that is corresponding to the identifier and that is in the rule matching table, the to-be-processed data packet on a target layer indicated by the protocol-stack layer jump processing policy.

According to a first possible implementation manner of a second aspect of the present application, the present application provides an apparatus for processing network protocol stack data, where the apparatus includes:

an extraction unit, configured to extract, from a to-be-processed data packet, an identifier used to indicate a data flow to which the to-be-processed data packet belongs;

a detection unit, configured to detect whether a pre-generated rule matching table includes the identifier; and a processing unit, configured to: when the rule matching table includes the identifier, process, according to a protocol-stack layer jump processing policy that is corresponding to the identifier and that is in the rule matching table, the to-be-processed data packet on a target layer indicated by the protocol-stack layer jump processing policy.

It may be learned from the foregoing technical solution that, according to a method and apparatus for processing network protocol stack data in the present application, an identifier used to indicate a data flow to which a to-be-processed data packet belongs is extracted from the to-be-processed data packet, and when a pre-generated rule matching table includes the identifier, processing is performed, according to a protocol-stack layer jump processing policy that is corresponding to the identifier and that is in the rule matching table, on the to-be-processed data packet on a target layer indicated by the protocol-stack layer jump processing policy, so that unnecessary processing may not be performed on some data packets that do not need to be processed on all protocol-stack layers, so as to reduce or even avoid unnecessary consumption of computing resources and transmission resources.

BRIEF DESCRIPTION OF THE DRAWINGS

To describe technical solutions in embodiments of the present disclosure or in the prior art more clearly, the following briefly describes accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

To make the disclosure objectives, features, and advantages of the present disclosure clearer and more comprehensible, the following clearly and completely describes technical solutions in embodiments of the present disclosure with reference to accompanying drawings in the embodiments of the present disclosure. Apparently, the embodiments described in the following are merely some but not all of the embodiments of the present disclosure. All other embodiments obtained by persons of ordinary skill in the art based on the embodiments of the present disclosure without creative efforts shall fall within the protection scope of the present disclosure.

Terms such as "a first", "a second", "a third", "a fourth", and the like (if any) in the specification, claims, and the foregoing accompanying drawings of the present disclosure are used to distinguish between similar objects, and are not necessarily used to describe a specific sequence or order. It should be understood that the data termed in such a way are interchangeable in proper circumstances so that the embodiments of the present disclosure described herein can be implemented in orders except the order illustrated or described herein. Furthermore, the terms "include" and "have" and any variations thereof, are intended to cover a non-exclusive inclusion. For example, a process, a method, a system, a product, or a device that includes a series of steps and units, is not necessarily limited to expressly listing the steps or units, but may include other steps or units that are not expressly listed or that are inherent to such process, method, product, or device.

In the prior art, for user plane data packets of some types of applications, the data packets feature a small data volume, and if a PDCP layer and an RLC layer that are of a protocol stack are used to process the data packet, no gain may be generated, instead, computing resources may be consumed, and in addition, the added packet headers of the two layers may inevitably consume transmission resources. For this reason, an implementation manner of the present application discloses a method and apparatus for processing network protocol stack data. An identifier used to indicate a data flow to which a to-be-processed data packet belongs is extracted from the to-be-processed data packet, and when a pre-generated rule matching table includes the identifier, multiple protocol-stack layers are jumped according to a protocol-stack layer jump processing policy that is corresponding to the identifier and that is in the rule matching table, and processing is directly performed on the to-be-processed data packet on a target layer indicated by the protocol-stack layer jump processing policy, so that unnecessary processing may not be performed on some data packets that do not need to be processed on all protocol-stack layers, so as to reduce or even avoid unnecessary consumption of computing resources and transmission resources.

Figure 1:
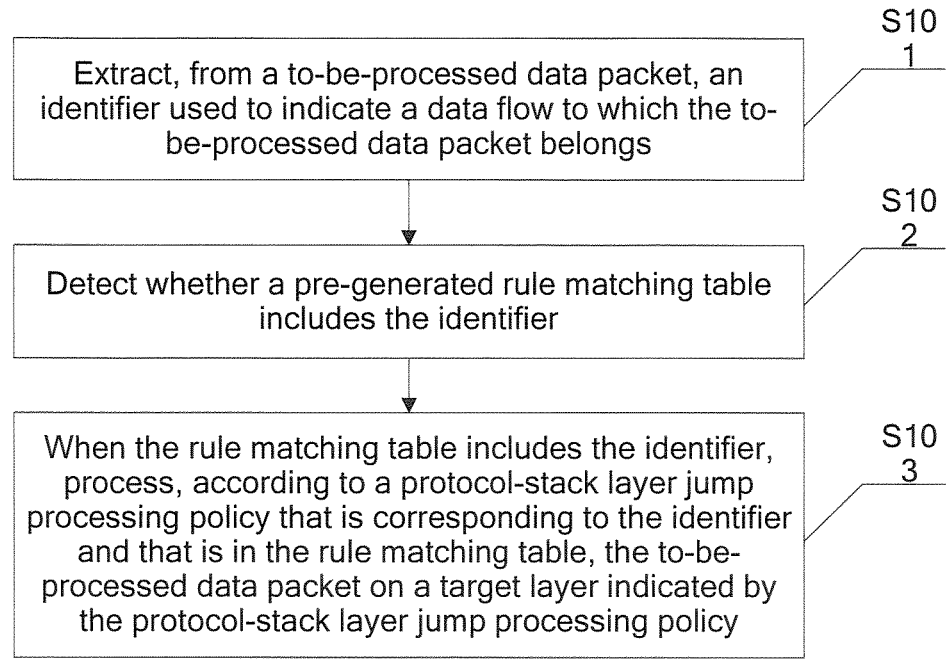
FIG. 1 is a flowchart of Embodiment 1 of a method for processing network protocol stack data according to the present application.

Referring to FIG. 1, FIG. 1 is a flowchart of Embodiment 1 of a method for processing network protocol stack data according to the present application. The method is applicable to both a terminal and a wireless access point. The terminal has functions of all protocol-stack layers in a communications network, that is, the functions of all the protocol-stack layers from a transmission layer to a physical layer, or have only functions of a simple protocol stack that includes an application layer, a MAC layer, and a physical layer. The wireless access point may be a base station. As shown in FIG. 1, the method may include the following steps:

S101. Extract, from a to-be-processed data packet, an identifier used to indicate a data flow to which the to-be-processed data packet belongs.

A data flow includes multiple to-be-processed data packets, and a data flow to which the to-be-processed data packet belongs may be determined according to an identifier extracted from the to-be-processed data packet.

It should be noted that the foregoing to-be-processed data packet may be an uplink data packet to be transmitted on a terminal side, or a downlink data packet to be transmitted on a wireless access point side, or an uplink data packet received on a wireless access point side, or a downlink data packet received on a terminal side.

S102. Detect whether a pre-generated rule matching table includes the identifier.

The pre-generated rule matching table includes the identifier used to indicate the data flow to which the to-be-processed data packet belongs and a protocol-stack layer jump processing policy corresponding to the identifier. It should be noted that the pre-generated rule matching table can be classified into an uplink type and a downlink type, that is, rule matching tables separately used when the terminal side and the wireless access point act as receive ends may be different, and rule matching tables separately used when the terminal and the wireless access point act as transmit ends may be different. Data packets that belong to different data flows can be distinguished according to the pre-generated rule matching table, and further different protocol-stack layer jump processing policies can be used to process the data packets.

S103. When the rule matching table includes the identifier, process, according to a protocol-stack layer jump processing policy that is corresponding to the identifier and that is in the rule matching table, the to-be-processed data packet on a target layer indicated by the protocol-stack layer jump processing policy.

It should be noted that, for the terminal or the wireless access point that has the functions of all the protocol-stack layers in the communications network, when the rule matching table includes the identifier, multiple protocol-stack layers are jumped according to the protocol-stack layer jump processing policy that is corresponding to the identifier and that is in the rule matching table, and processing is directly performed on the to-be-processed data packet on the target layer indicated by the protocol-stack layer jump processing policy.

Further, it should be noted that when the rule matching table does not include the identifier, no protocol-stack layer is jumped, and the to-be-processed data packet is processed on all the protocol-stack layers that the terminal or the wireless access point has.

This embodiment discloses a method for processing network protocol stack data. An identifier used to indicate a data flow to which a to-be-processed data packet belongs is extracted from the to-be-processed data packet, and when a pre-generated rule matching table includes the identifier, multiple protocol-stack layers are jumped according to a protocol-stack layer jump processing policy that is corresponding to the identifier and that is in the rule matching table, and processing is directly performed on the to-be-processed data packet on a target layer indicated by the protocol-stack layer jump processing policy, so that unnecessary processing may not be performed on some data packets that do not need to be processed on all protocol-stack layers, so as to reduce or even avoid unnecessary consumption of computing resources and transmission resources.

Figure 2:
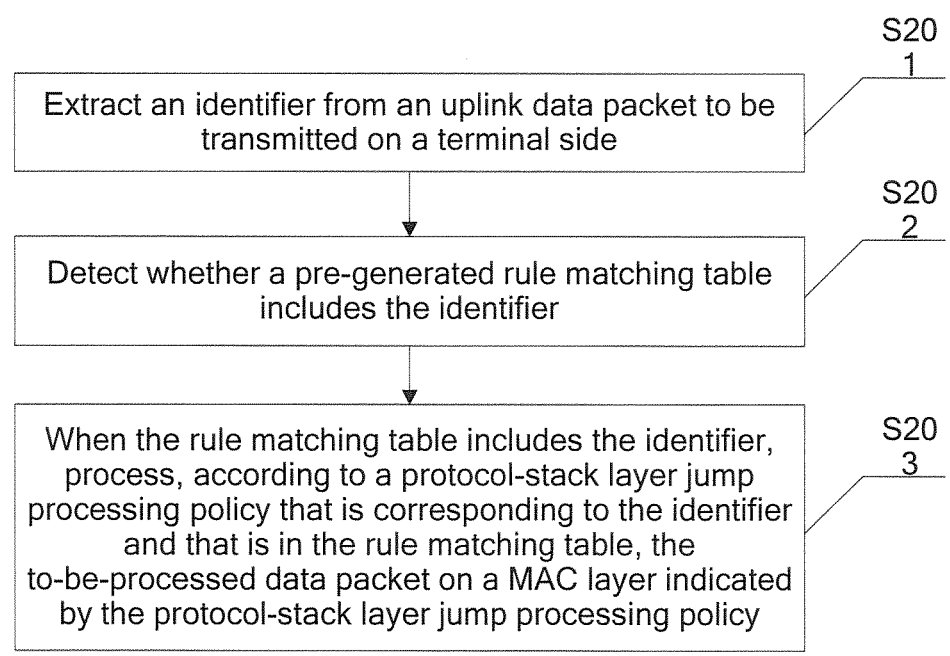
FIG. 2 is a flowchart of Embodiment 2 of a method for processing network protocol stack data according to the present application.
Figure 3:
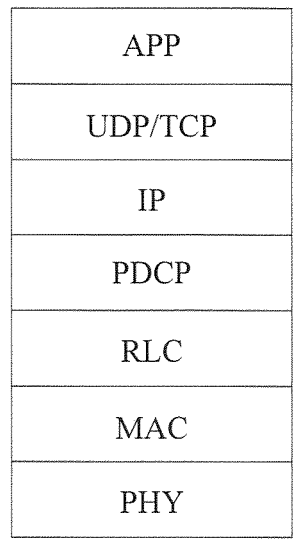
FIG. 3 is a schematic diagram of a terminal protocol stack of Embodiment 2 of a method for processing network protocol stack data according to the present application.

To better understand the technical solutions in the embodiments of the present disclosure, refer to FIG. 2. FIG. 2 is a flowchart of Embodiment 2 of a method for processing network protocol stack data according to the present application. The method is applicable to a terminal that has functions of all protocol-stack layers. All the protocol-stack layers of the terminal are shown in FIG. 3, where a to-be-processed data packet is an uplink data packet to be transmitted on a terminal side. In the prior art, when the terminal acts as a transmit end of a data packet, the data packet is processed in a top-bottom sequence of protocol-stack layers, that is, the data packet to be transmitted needs to be sequentially processed on an APP layer, a UDP/TCP layer, an IP layer, a PDCP layer, an RLC layer, a MAC layer, and a PHY layer, and neither out-of-order processing nor layer jump is allowed. That is, if the data packet is being processed on the IP layer, it indicates that the data packet has been processed on the APP layer and UDP/TCP layer, and has not been processed on the PDCP layer, the RLC layer, the MAC layer, or the PHY layer.

In the embodiment shown in FIG. 2, the method may include the following steps:

S201. Extract an identifier from an uplink data packet to be transmitted on a terminal side.

It should be noted that the identifier is used to indicate a data flow to which the uplink data packet to be transmitted on the terminal side belongs. The uplink data packet to be transmitted on the terminal side is a data packet that has been processed on an IP layer; or to make data transmitted on an air interface side simpler, the uplink data packet to be transmitted on the terminal side may also be a data packet that has been processed on an APP layer.

S202. Detect whether a pre-generated rule matching table includes the identifier.

It should be noted that, in this embodiment, the pre-generated rule matching table is a rule matching table used when the uplink data packet to be transmitted is processed on the terminal side. The identifier includes but is not limited to any one or any combination of multiple identifiers of the following: a radio bearer identifier, a tunnel endpoint identifier on a general data transfer platform, and an IP 5-tuple, and a logical channel identifier, where the IP 5-tuple includes a source IP address, a source port, a destination IP address, a destination port, and a transmission layer protocol number.

Further, it should be noted that all rule matching tables may be pre-generated in the following two manners:

Manner 1: The identifier used to indicate the data flow to which the to-be-processed data packet belongs and a protocol-stack layer jump processing policy corresponding to the identifier are received, where the identifier and the protocol-stack layer jump processing policy are sent by a centralized controller; and the rule matching table is generated according to the identifier and the protocol-stack layer jump processing policy corresponding to the identifier, where the rule matching table includes an identifier field and a protocol-stack layer jump processing policy field, the identifier field includes the identifier used to indicate a data flow to which the to-be-processed data packet belongs, and the protocol-stack layer jump processing policy field includes the protocol-stack layer jump processing policy corresponding to the identifier.

Manner 2: The rule matching table sent by a centralized controller is received, where the rule matching table includes an identifier field and a protocol-stack layer jump processing policy field, the identifier field includes the identifier used to indicate a data flow to which the to-be-processed data packet belongs, and the protocol-stack layer jump processing policy field includes the protocol-stack layer jump processing policy corresponding to the identifier.

In this embodiment, a specific form of the rule matching table is not limited, and for persons skilled in the art, no matter what manner is used and what rule matching table is generated, the rule matching table is within the protection scope of the present application, provided that the rule matching table has the identifier used to indicate the data flow to which the to-be-processed data packet belongs and the protocol-stack layer jump processing policy corresponding to the identifier.

S203. When the rule matching table includes the identifier, process, according to a protocol-stack layer jump processing policy that is corresponding to the identifier and that is in the rule matching table, the to-be-processed data packet on a MAC layer indicated by the protocol-stack layer jump processing policy.

It should be noted that, in this embodiment, when the rule matching table includes the identifier, the to-be-processed data packet does not need to be sequentially processed on the APP layer, a UDP/TCP layer, the IP layer, a PDCP layer, an RLC layer, the MAC layer, and a PHY layer; instead, multiple protocol-stack layers are jumped according to the protocol-stack layer jump processing policy that is corresponding to the identifier and that is in the rule matching table, and processing is directly performed on the to-beprocessed data packet on the MAC layer indicated by the protocol-stack layer jump processing policy.

Specifically, when the to-be-processed data packet is the uplink data packet that has been processed on the IP layer and that is to be transmitted on the terminal side, the PDCP layer and RLC layer are sequentially jumped and the to-be-processed data packet is put into a queue of the MAC layer.

When the to-be-processed data packet is an uplink data packet that has been processed on the APP layer and that is to be transmitted on the terminal side, the UDP layer, the IP layer, the PDCP layer, and the RLC layer are sequentially jumped, and the to-be-processed data packet is put into a queue of the MAC layer; or the TCP layer, the IP layer, the PDCP layer, and the RLC layer are sequentially jumped, and the to-be-processed data packet is put into a queue of the MAC layer.

Figure 4:
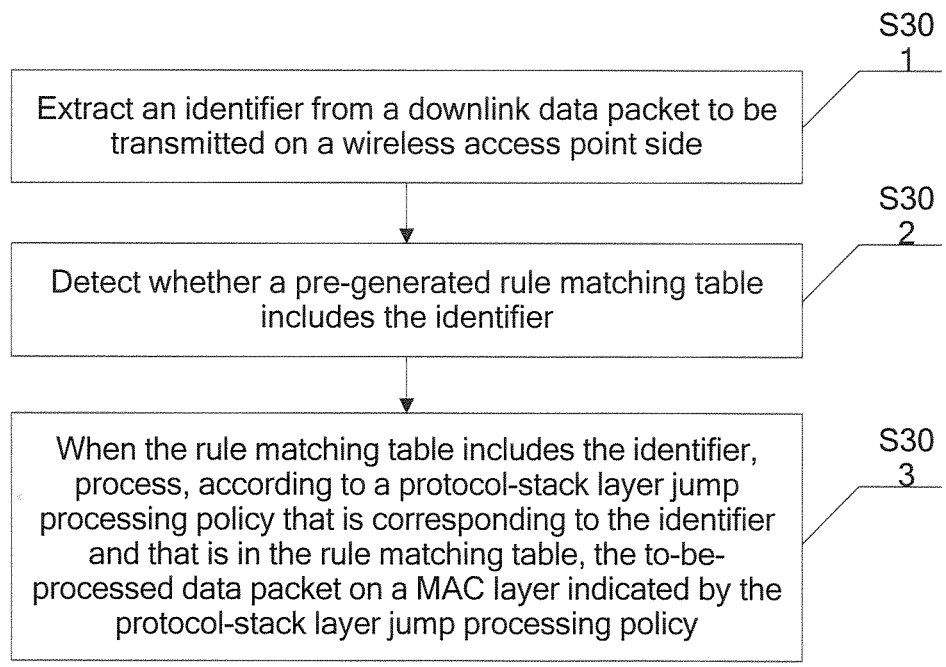
FIG. 4 is a flowchart of Embodiment 3 of a method for processing network protocol stack data according to the present application.
Figure 5:
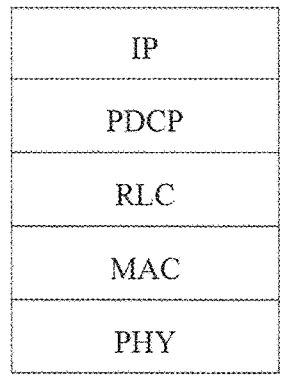
FIG. 5 is a schematic diagram of a wireless access point protocol stack of Embodiment 3 of a method for processing network protocol stack data according to the present application.

To better understand the technical solutions in the embodiments of the present disclosure, refer to FIG. 4. FIG. 4 is a flowchart of Embodiment 3 of a method for processing network protocol stack data according to the present application. The method is applicable to a wireless access point. All protocol-stack layers of the wireless access point are shown in FIG. 5, where a to-be-processed data packet is a downlink data packet to be transmitted on a wireless access point side. In the prior art, when the wireless access point acts as a transmit end of the downlink data packet, the data packet is processed in a top-bottom sequence of protocol-stack layers, that is, a received IP data packet is sequentially processed on a PDCP layer, an RLC layer, a MAC layer, and a PHY layer, and neither out-of-order processing nor layer jump is allowed. That is, if a data packet is received on an IP layer, it indicates that the data packet has not been processed on the PDCP layer, the RLC layer, the MAC layer, or the PHY layer.

As shown in FIG. 4, the method may include the following steps:

S301. Extract an identifier from a downlink data packet to be transmitted on a wireless access point side.

It should be noted that the identifier is used to indicate a data flow to which the downlink data packet to be transmitted on the wireless access point side belongs. The downlink data packet to be transmitted on the wireless access point side is a data packet that has been processed on an IP layer.

It should be noted that the data packet that has been processed on the IP layer may be processed by the wireless access point, or may be processed by another network element, which is not limited in the present application.

S302. Detect whether a pre-generated rule matching table includes the identifier.

It should be noted that, in this embodiment, the pre-generated rule matching table is a rule matching table used when the downlink data packet to be transmitted is processed on the wireless access point side. For related description about the rule matching table, refer to related description in step S202 in the method Embodiment 2, and details are not described in this embodiment again.

S303. When the rule matching table includes the identifier, process, according to a protocol-stack layer jump processing policy that is corresponding to the identifier and that is in the rule matching table, the to-be-processed data packet on a MAC layer indicated by the protocol-stack layer jump processing policy.

It should be noted that, in this embodiment, when the rule matching table includes the identifier, the to-be-processed data packet does not need to be sequentially processed on a PDCP layer, an RLC layer, the MAC layer, and a PHY layer; instead, multiple protocol-stack layers are jumped according to the protocol-stack layer jump processing policy that is corresponding to the identifier and that is in the rule matching table, and processing is directly performed on the to-be-processed data packet on the MAC layer indicated by the protocol-stack layer jump processing policy.

Specifically, when the to-be-processed data packet is the downlink data packet that has been processed on the IP layer and that is to be transmitted on the wireless access point side, the PDCP layer and RLC layer are sequentially jumped and the to-be-processed data packet is put into a queue of the MAC layer. The downlink data packet that has been processed on the IP layer is a downlink data packet whose IP packet header and UDP packet header are not removed, or a downlink data packet whose IP packet header and TCP packet header are not removed, or a downlink data packet whose IP packet header and UDP packet header have been removed, or a downlink data packet whose IP packet header and TCP packet header have been removed.

It should be noted that when an uplink data packet transmitted on a terminal side is a data packet for which processing on the PDCP layer and the RLC layer is jumped, a corresponding downlink data packet transmitted on the wireless access point side is a downlink data packet whose IP packet header and UDP packet header are not removed, or a downlink data packet whose IP packet header and TCP packet header are not removed; when an uplink data packet transmitted on a terminal side is a data packet for which processing on a TCP/UDP layer, the IP layer, the PDCP layer, and the RLC layer is jumped, a corresponding downlink data packet transmitted on the wireless access point side is a downlink data packet whose IP packet header and UDP packet header have been removed, or a downlink data packet whose IP packet header and TCP packet header have been removed. Certainly, when the data flow exists only in a downlink direction, whether the downlink data packet that has been processed on the IP layer and that is to be transmitted on the access point is the downlink data packet whose IP packet header and TCP packet header are removed or the downlink data packet whose IP packet header and UDP packet header are removed depends on the protocol-stack layer jump processing policy corresponding to the identifier.

Further, it should be noted that the downlink data packet whose IP packet header and UDP packet header have been removed or the downlink data packet whose IP packet header and TCP packet header have been removed is obtained in the following manners:

Manner 1: The downlink data packet whose IP packet header and UDP packet header are not removed, or the downlink data packet whose IP packet header and TCP packet header are not removed is received on the wireless access point side, and then the IP packet header and the UDP packet header of the downlink data packet, or the IP packet header and the TCP packet header of the downlink data packet are removed according to an indication of the protocol-stack layer jump processing policy that is corresponding to the identifier and that is in the rule matching table, so as to obtain the downlink data packet whose IP packet header and UDP packet header have been removed or the downlink data packet whose IP packet header and TCP packet header have been removed.

Manner 2: The downlink data packet whose IP packet header and UDP packet header have been removed by another network element is directly received on the wireless access point side, or the downlink data packet whose IP packet header and TCP packet header have been removed by another network element is directly received on the wireless access point side.

It should be noted that, for a protocol stack that is of the wireless access point and that is shown in FIG. 5, in an actual network, the protocol stack of the wireless access point may not have a function of the highest layer, that is, the IP layer, but a downlink data packet that is received by the wireless access point from another network element device such as a gateway and that is to be sent is in an IP format. In the present disclosure, to show a meaning of layer jump more clearly, an IP layer is added to the diagram that is of all protocol-stack layers of the wireless access point and that is shown in FIG. 5, but it does not mean that the wireless access point is required to have the function of IP layer processing. Certainly, the downlink data packet that is received by the wireless access point from a gateway/router device and that is to be sent may not be an IP packet, but a data packet in another protocol format; in this case, a processing process of the wireless access point does not have a difference; therefore, in the present patent, only a situation of the IP data packet is used for description. A situation in which the downlink data packet is in another format is not described.

Figure 6:
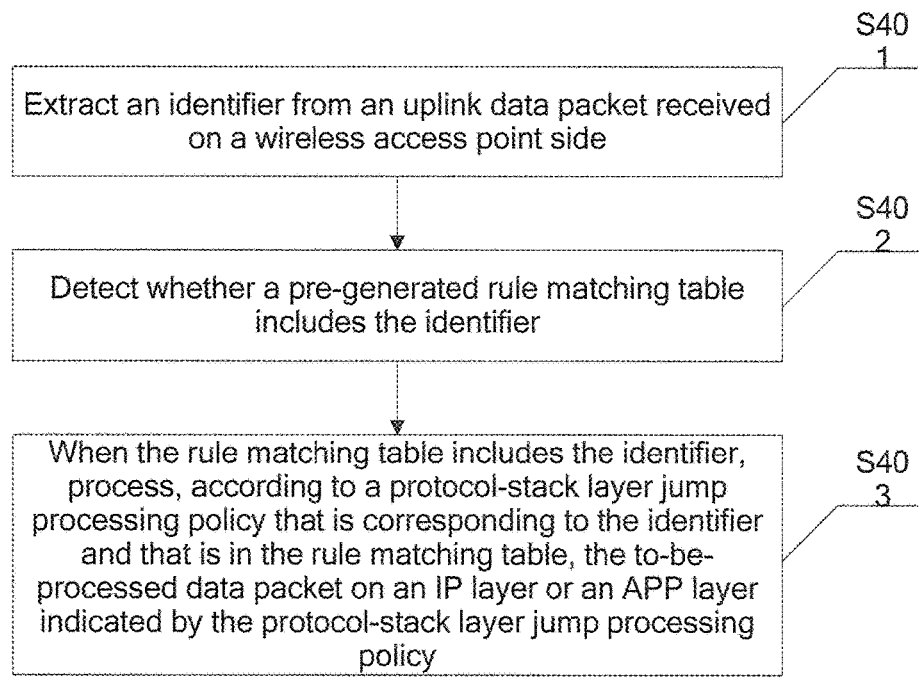
FIG. 6 is a flowchart of Embodiment 4 of a method for processing network protocol stack data according to the present application.
Figure 7:
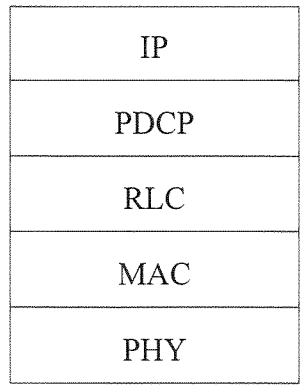
FIG. 7 is a schematic diagram of a wireless access point protocol stack of Embodiment 4 of a method for processing network protocol stack data according to the present application.

To better understand the technical solutions in the embodiments of the present disclosure, refer to FIG. 6. FIG. 6 is a flowchart of Embodiment 4 of a method for processing network protocol stack data according to the present application. The method is applicable to a wireless access point. All protocol-stack layers of the wireless access point are shown in FIG. 7, where a to-be-processed data packet is an uplink data packet received on a wireless access point side. In the prior art, when the wireless access point acts as a receive end of the uplink data packet, the data packet is processed in a bottom-top sequence of protocol-stack layers, that is, the received data packet is sequentially processed by the access point on a PHY layer, a MAC layer, an RLC layer, and a PDCP layer, and finally is sent to a gateway/router device in an IP packet format, and neither out-of-order processing nor layer jump is allowed. For example, if the data packet has been processed on the MAC layer, it indicates that the data packet has also been processed on the PHY layer, but has not been processed on the RLC layer or the PDCP layer.

As shown in FIG. 6, the method may include the following steps:

S401. Extract an identifier from an uplink data packet received on a wireless access point side.

It should be noted that the identifier is used to indicate a data flow to which the uplink data packet received on the wireless access point side belongs. The uplink data packet received on the wireless access point side is a data packet that has been processed on a MAC layer.

S402. Detect whether a pre-generated rule matching table includes the identifier.

It should be noted that, in this embodiment, the pre-generated rule matching table is a rule matching table used when the received uplink data packet is processed on the wireless access point side. For related description about the rule matching table, refer to related description in step S202 in the method Embodiment 2, and details are not described in this embodiment again.

S403. When the rule matching table includes the identifier, process, according to a protocol-stack layer jump processing policy that is corresponding to the identifier and that is in the rule matching table, the to-be-processed data packet on an IP layer or an APP layer indicated by the protocol-stack layer jump processing policy.

It should be noted that, in this embodiment, when the rule matching table includes the identifier, the to-be-processed data packet does not need to be sequentially processed on a PHY layer, the MAC layer, an RLC layer, and a PDCP layer; instead, multiple protocol-stack layers are jumped according to the protocol-stack layer jump processing policy that is corresponding to the identifier and that is in the rule matching table, and processing is directly performed on the to-be-processed data packet on the IP layer or APP layer indicated by the protocol-stack layer jump processing policy.

Specifically, when the to-be-processed data packet is the uplink data packet that has been processed on the MAC layer and that is received on the wireless access point side, and the target layer indicated by the protocol-stack layer jump processing policy is the IP layer, the RLC layer and PDCP layer are sequentially jumped, and the to-be-processed data packet is sent in an IP manner.

When the to-be-processed data packet is an uplink data packet that has been processed on the MAC layer and that is received on the wireless access point side, and the target layer indicated by the protocol-stack layer jump processing policy is the APP layer, the RLC layer and PDCP layer are sequentially jumped, and a UDP packet header and an IP packet header are added to the to-be-processed data packet and then the packet is sent, or a TCP packet header and an IP packet header are added to the to-be-processed data packet and then the packet is sent; or the RLC layer and PDCP layer are sequentially jumped, and the to-be-processed data packet is sent to another network element, so that the another network element adds a UDP packet header and an IP packet header to the to-be-processed data packet and then sends the packet, or the another network element adds a TCP packet header and an IP packet header to the to-be-processed data packet and then sends the packet.

It should be noted that if the uplink data packet received on the wireless access point side is a data packet obtained after processing on the PDCP layer and RLC layer is jumped on a terminal side, the UDP packet header and the IP packet header do not need to be added, or the TCP packet header and the IP packet header do not need to be added; if the uplink data packet received on the wireless access point side is a data packet obtained after being processed on a UDP/TCP layer, the IP layer, the PDCP layer, and the RLC layer on a terminal and but not processed on the IP layer on the terminal side, the UDP packet header and the IP packet header need to be added or the TCP packet header and the IP packet header need to be added.

Further, it should be noted that the wireless access point side performs communication interaction with a server on the IP layer; therefore, the target APP layer indicated by the foregoing protocol-stack layer jump processing policy only indicates that the UDP packet header and the IP packet header need to be added, or indicates that the TCP packet header and the IP packet header need to be added.

It should be further noted that, for a protocol stack that is of the wireless access point and that is shown in FIG. 7, in an actual network, the protocol stack of the wireless access point may not have a function of the highest layer, that is, the IP layer, but an uplink data packet that is received by the wireless access point from the terminal and that needs to be transmitted to another network element is in an IP format. In the present disclosure, to show a meaning of layer jump more clearly, an IP layer is added to the diagram that is of all protocol-stack layers of the wireless access point and that is shown in FIG. 7, but it does not mean that the wireless access point is required to have the function of IP layer processing. Certainly, the uplink data packet that is received by the wireless access point from the terminal and that needs to be transmitted to the another network element may not be an IP packet, but a data packet in another protocol format; in this case, a processing process of the wireless access point does not have a difference; therefore, in the present patent, only a situation of the IP data packet is used for description. A situation in which the uplink data packet is in another format is not described.

Figure 8:
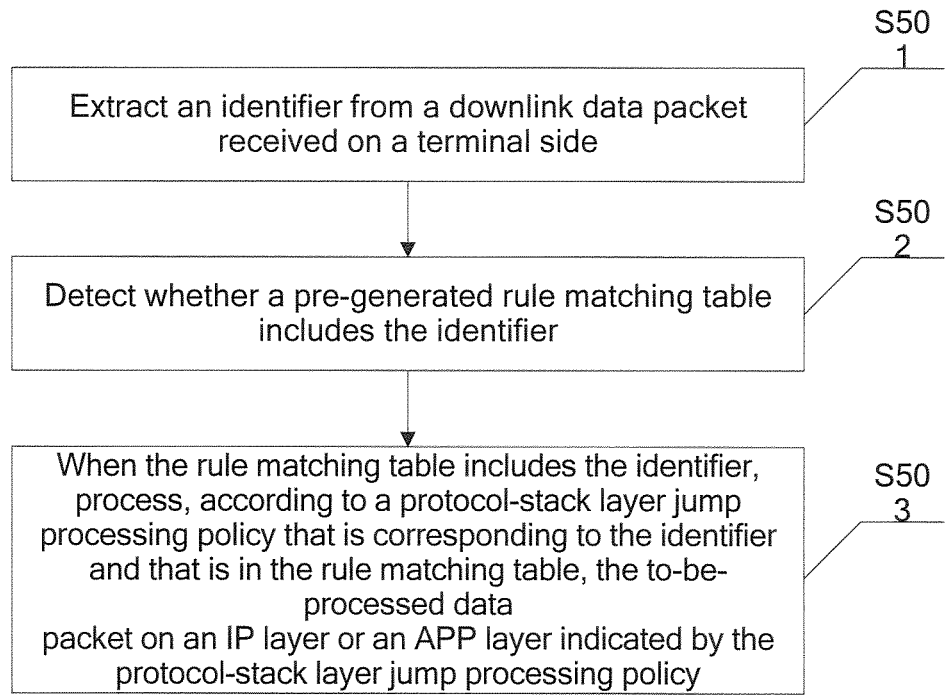
FIG. 8 is a flowchart of Embodiment 5 of a method for processing network protocol stack data according to the present application.
Figure 9:
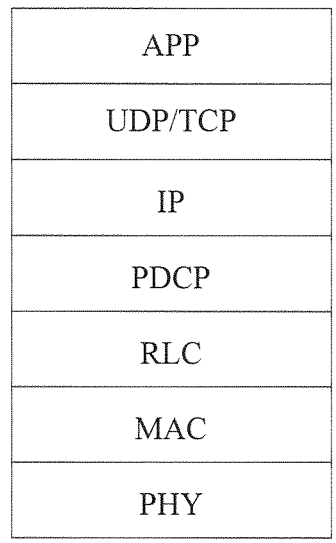
FIG. 9 is a schematic diagram of a terminal protocol stack of Embodiment 5 of a method for processing network protocol stack data according to the present application.

To better understand the technical solutions in the embodiments of the present disclosure, refer to FIG. 8. FIG. 8 is a flowchart of Embodiment 5 of a method for processing network protocol stack data according to the present application. The method is applicable to a terminal that has functions of all protocol-stack layers. All the protocol-stack layers of the terminal are shown in FIG. 9, where a to-be-processed data packet is a downlink data packet received on a terminal side. In the prior art, when the terminal acts as a receive end of the downlink data packet, the data packet is processed in a bottom-top sequence of protocol-stack layers, that is, the terminal sequentially processes the received data packet on a PHY layer, a MAC layer, an RLC layer, a PDCP layer, an IP layer, a UDP/TCP layer, and an APP layer, and neither out-of-order processing nor layer jump is allowed. For example, if the downlink data packet received on the terminal side has been processed on the MAC layer, it indicates that the data packet has also been processed on the PHY layer, but has not been processed on the RLC layer, the PDCP layer, the IP layer, the UDP/TCP layer, or the APP layer.

As shown in FIG. 8, the method may include the following steps:

S501. Extract an identifier from a downlink data packet received on a terminal side.

It should be noted that the identifier is used to indicate a data flow to which the downlink data packet received on the terminal side belongs. The downlink data packet received on the terminal side is a data packet that has been processed on a MAC layer.

S502. Detect whether a pre-generated rule matching table includes the identifier.

It should be noted that, in this embodiment, the pre-generated rule matching table is a rule matching table used when the received downlink data packet is processed on the terminal side. For related description about the rule matching table, refer to related description in step S202 in the method Embodiment 2, and details are not described in this embodiment again.

S503. When the rule matching table includes the identifier, process, according to a protocol-stack layer jump processing policy that is corresponding to the identifier and that is in the rule matching table, the to-be-processed data packet on an IP layer or an APP layer indicated by the protocol-stack layer jump processing policy.

It should be noted that, in this embodiment, when the rule matching table includes the identifier, the to-be-processed data packet does not need to be sequentially processed on a PHY layer, the MAC layer, an RLC layer, a PDCP layer, the IP layer, a UDP/TCP layer, and the APP layer; instead, multiple protocol-stack layers are jumped according to the protocol-stack layer jump processing policy that is corresponding to the identifier and that is in the rule matching table, and processing is directly performed on the to-be-processed data packet on the IP layer or APP layer indicated by the protocol-stack layer jump processing policy.

It should be noted that when the to-be-processed data packet is the downlink data packet that has been processed on the MAC layer and that is received on the terminal side and when the target layer indicated by the protocol-stack layer jump processing policy is the IP layer, the RLC layer and the PDCP layer are sequentially jumped, and the to-be-processed data packet is put into a queue of the IP layer.

When the to-be-processed data packet is a downlink data packet that has been processed on the MAC layer and that is received on the terminal side, and when the target layer indicated by the protocol-stack layer jump processing policy is the APP layer, the RLC layer, the PDCP layer, the IP layer, and the TCP layer are sequentially jumped, and the to-be-processed data packet is put into a queue of the APP layer, or the RLC layer, the PDCP layer, the IP layer, and the UDP layer are sequentially jumped, and the to-be-processed data packet is put into a queue of the APP layer.

Figure 10:
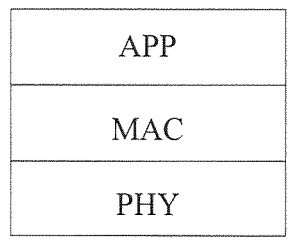
FIG. 10 is a schematic diagram of a terminal protocol stack of Embodiment 6 of a method for processing network protocol stack data according to the present application.

To better understand the technical solutions in the embodiments of the present disclosure, the present application further provides Embodiment 6 of a method for processing network protocol stack data. The method is applicable to a system with a terminal and a wireless access point that have a simplified protocol stack each, where the simplified protocol stack includes an APP layer, a MAC layer, and a wireless access control PHY layer, which are specifically shown in FIG. 10.

Based on the foregoing terminal that has the simplified protocol stack, when the to-be-processed data packet is an uplink data packet that has been processed on an APP layer and that is to be transmitted on a terminal side, the to-be-processed data packet is put into a queue of a MAC layer.

When the to-be-processed data packet is an uplink data packet that has been processed on the MAC layer and that is received on a wireless access point side, an RLC layer and a PDCP layer are sequentially jumped, and a UDP packet header and an IP packet header are added to the to-be-processed data packet and then the packet is sent, or a TCP packet header and an IP packet header are added to the to-be-processed data packet and then the packet is sent; or the to-be-processed data packet is sent to another network element, so that the another network element adds a UDP packet header and an IP packet header to the to-be-processed data packet and then sends the packet, or the another network element adds a TCP packet header and an IP packet header to the to-be-processed data packet and then sends the packet.

When the to-be-processed data packet is a downlink data packet that has been processed on an IP layer and that is to be transmitted on the wireless access point side, the PDCP layer and the RLC layer are sequentially jumped, and the to-be-processed data packet is then put into a queue of the MAC layer. The downlink data packet that has been processed on the IP layer is a downlink data packet whose IP packet header and UDP packet header have been removed, or a downlink data packet whose IP packet header and TCP packet header have been removed.

It should be noted that the data packet that has been processed on the IP layer may be processed by the wireless access point, or may be processed by another network element, which is not limited in the present application.

It should be noted that manners of obtaining the downlink data packet whose IP packet header and UDP packet header have been removed or the downlink data packet whose IP packet header and TCP packet header have been removed are the same as those in step S303, and details are not described herein again.

The to-be-processed data packet is put into a queue of the APP layer when the to-be-processed data packet is a downlink data packet that has been processed on the MAC layer and that is received on the terminal side.

The method embodiments 2 to 6 separately introduce in detail how a terminal and a wireless access point side jump, according to a protocol-stack layer jump processing policy that is corresponding to an identifier of a to-be-processed data packet and that is in a preset rule matching table, multiple protocol-stack layers and directly process a to-be-processed data packet on a target layer indicated by the protocol-stack layer jump processing policy; in this way, unnecessary processing may not be performed on some data packets that do not need to be processed on all protocol-stack layers, so as to reduce or even avoid unnecessary consumption of computing resources and transmission resources.

In addition, an embodiment of the present application further provides an apparatus for processing network protocol stack data, which is described in detail in the following by using the following embodiments.

Figure 11:
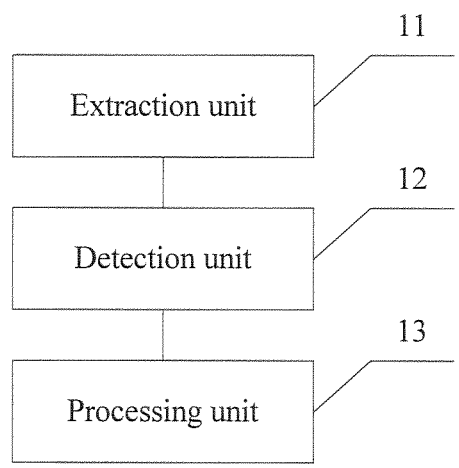
FIG. 11 is a structural diagram of Embodiment 1 of an apparatus for processing network protocol stack data according to the present application.

Referring to FIG. 11, FIG. 11 is a structural diagram of Embodiment 1 of an apparatus for processing network protocol stack data according to the present application. The apparatus may be a terminal, may be a wireless access point, or may be a terminal that has a simplified protocol stack. As shown in FIG. 11, the apparatus may include:

an extraction unit 11, configured to extract, from a to-be-processed data packet, an identifier used to indicate a data flow to which the to-be-processed data packet belongs;

a detection unit 12, configured to detect whether a pre-generated rule matching table includes the identifier; and a processing unit 13, configured to: when the rule matching table includes the identifier, process, according to a protocol-stack layer jump processing policy that is corresponding to the identifier and that is in the rule matching table, the to-be-processed data packet on a target layer indicated by the protocol-stack layer jump processing policy.

It should be noted that implementation of specific functions of the foregoing units has been described in detail in the method embodiments; for specific description, refer to related description in the method embodiments, and details are not described in this embodiment again.

Figure 12:
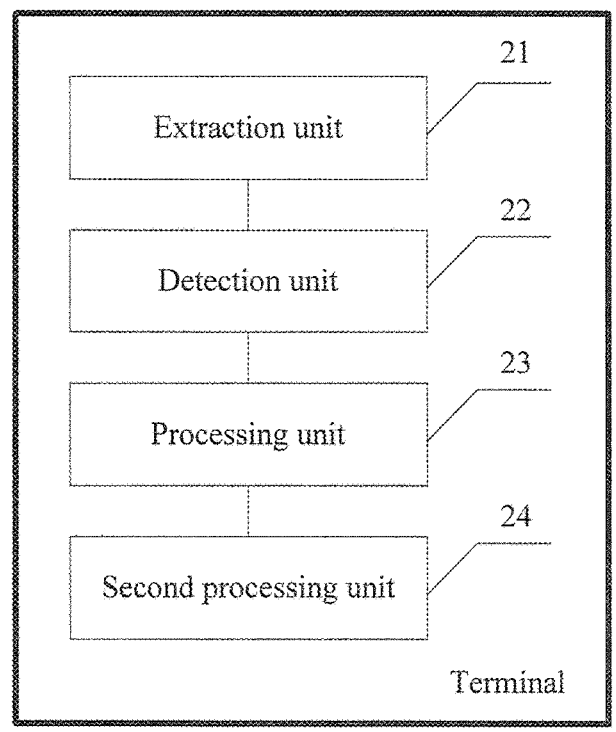
FIG. 12 is a structural diagram of Embodiment 2 of an apparatus for processing network protocol stack data according to the present application.

To better understand the technical solutions in the embodiments of the present disclosure, refer to FIG. 12. FIG. 12 is a structural diagram of Embodiment 2 of an apparatus for processing network protocol stack data according to the present application. The apparatus may be a terminal that has functions of all protocol-stack layers. As shown in FIG. 12, the apparatus may include an extraction unit 21, a detection unit 22, a processing unit 23, and a second processing unit 24.

The extraction unit 21 is configured to extract, from a to-be-processed data packet, an identifier used to indicate a data flow to which the to-be-processed data packet belongs.

The detection unit 22 is configured to detect whether a pre-generated rule matching table includes the identifier.

The rule matching table is pre-generated in the following manner:

The identifier used to indicate the data flow to which the to-be-processed data packet belongs and a protocol-stack layer jump processing policy corresponding to the identifier are received, where the identifier and the protocol-stack layer jump processing policy are sent by a centralized controller; and the rule matching table is generated according to the identifier and the protocol-stack layer jump processing policy corresponding to the identifier, where the rule matching table includes an identifier field and a protocol-stack layer jump processing policy field, the identifier field includes the identifier used to indicate a data flow to which the to-be-processed data packet belongs, and the protocol-stack layer jump processing policy field includes the protocol-stack layer jump processing policy corresponding to the identifier;

or, the rule matching table sent by a centralized controller is received, where the rule matching table includes an identifier field and a protocol-stack layer jump processing policy field, the identifier field includes the identifier used to indicate a data flow to which the to-be-processed data packet belongs, and the protocol-stack layer jump processing policy field includes the protocol-stack layer jump processing policy corresponding to the identifier.

The identifier used to indicate a data flow to which the to-be-processed data packet belongs is any one or any combination of multiple identifiers of the following: a radio bearer identifier, a tunnel endpoint identifier on a general data transfer platform, an IP 5-tuple, and a logical channel identifier, where the IP 5-tuple includes a source IP address, a source port, a destination IP address, a destination port, and a transmission layer protocol number.

The processing unit 23 is configured to: when the rule matching table includes the identifier, process, according to the protocol-stack layer jump processing policy that is corresponding to the identifier and that is in the rule matching table, the to-be-processed data packet on a target layer indicated by the protocol-stack layer jump processing policy.

It should be noted that when the to-be-processed data packet is an uplink data packet to be transmitted on a terminal side, the to-be-processed data packet is a data packet that has been processed on an IP layer or an application APP layer, and the target layer indicated by the protocol-stack layer jump processing policy is a medium access control MAC layer, and the processing unit 23 is specifically configured to:

when the to-be-processed data packet is the uplink data packet that has been processed on the IP layer and that is to be transmitted on the terminal side, sequentially jump a Packet Data Convergence Protocol PDCP layer and a Radio Link Control RLC layer, and put the to-be-processed data packet into a queue of the MAC layer; or when the to-be-processed data packet is the uplink data packet that has been processed on the APP layer and that is to be transmitted on the terminal side, sequentially jump a User Datagram Protocol UDP layer, the IP layer, a PDCP layer, and an RLC layer, and put the to-be-processed data packet into a queue of the MAC layer, or sequentially jump a Transmission Control Protocol TCP layer, the IP layer, a PDCP layer, and an RLC layer, and put the to-be-processed data packet into a queue of the MAC layer.

When the to-be-processed data packet is a downlink data packet received on the terminal side, the to-be-processed data packet is a data packet that has been processed on the wireless access control MAC layer, and the target layer indicated by the protocol-stack layer jump processing policy is the IP layer or the APP layer, and the processing unit is specifically configured to:

when the to-be-processed data packet is the downlink data packet that has been processed on the MAC layer and that is received on the terminal side, and when the target layer indicated by the protocol-stack layer jump processing policy is the IP layer, sequentially jump the RLC layer and PDCP layer, and put the to-be-processed data packet into a queue of the IP layer; or when the to-be-processed data packet is the downlink data packet that has been processed on the MAC layer and that is received on the terminal side, and when the target layer indicated by the protocol-stack layer jump processing policy is the APP layer, sequentially jump the RLC layer, the PDCP layer, the IP layer, and the TCP layer, and put the to-be-processed data packet into a queue of the APP layer, or sequentially jump the RLC layer, the PDCP layer, the IP layer, and the UDP layer, and put the to-be-processed data packet into a queue of the APP layer.

The second processing unit 24 is configured to: when the rule matching table does not include the identifier, process, without jumping protocol-stack layers, the to-be-processed data packet on all protocol-stack layers of the terminal.

Figure 13:
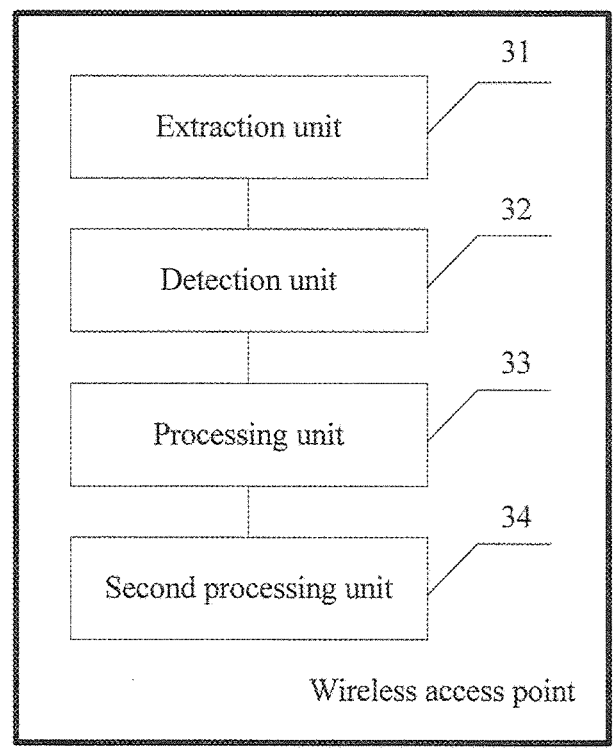
FIG. 13 is a structural diagram of Embodiment 3 of an apparatus for processing network protocol stack data according to the present application.

To better understand the technical solutions in the embodiments of the present disclosure, refer to FIG. 13. FIG. 13 is a structural diagram of Embodiment 3 of an apparatus for processing network protocol stack data according to the present application. The apparatus may be a wireless access point. As shown in FIG. 13, the apparatus may include: an extraction unit 31, a detection unit 32, a processing unit 33, and a second processing unity 34.

The extraction unit 31 is configured to extract, from a to-be-processed data packet, an identifier used to indicate a data flow to which the to-be-processed data packet belongs.

The detection unit 32 is configured to detect whether a pre-generated rule matching table includes the identifier.

The processing unit 33 is configured to: when the rule matching table includes the identifier, process, according to a protocol-stack layer jump processing policy that is corresponding to the identifier and that is in the rule matching table, the to-be-processed data packet on a target layer indicated by the protocol-stack layer jump processing policy.

It should be noted that when the to-be-processed data packet is a downlink data packet to be transmitted on a wireless access point side, the to-be-processed data packet is a data packet that has been processed on an IP layer, and the target layer indicated by the protocol-stack layer jump processing policy is a medium access control MAC layer, and the processing unit 33 is specifically configured to:

when the to-be-processed data packet is the downlink data packet that has been processed on the IP layer and that is to be transmitted on the wireless access point side, sequentially jump a Packet Data Convergence Protocol PDCP layer and a Radio Link Control RLC layer, and put the to-be-processed data packet into a queue of the MAC layer, where the downlink data packet that has been processed on the IP layer is a downlink data packet whose IP packet header and UDP packet header are not removed, or a downlink data packet whose IP packet header and TCP packet header are not removed, or a downlink data packet whose IP packet header and UDP packet header have been removed, or a downlink data packet whose IP packet header and TCP packet header have been removed.

The downlink data packet whose IP packet header and UDP packet header have been removed or the downlink data packet whose IP packet header and TCP packet header have been removed is obtained in the following manner:

The downlink data packet whose IP packet header and UDP packet header are not removed, or the downlink data packet whose IP packet header and TCP packet header are not removed is received on the wireless access point side, and then the IP packet header and the UDP packet header of the downlink data packet, or the IP packet header and the TCP packet header of the downlink data packet are removed according to an indication of the protocol-stack layer jump processing policy that is corresponding to the identifier and that is in the rule matching table, so as to obtain the downlink data packet whose IP packet header and UDP packet header have been removed or the downlink data packet whose IP packet header and TCP packet header have been removed; or the downlink data packet whose IP packet header and UDP packet header have been removed by another network element is directly received on the wireless access point side, or the downlink data packet whose IP packet header and TCP packet header have been removed by another network element is directly received on the wireless access point side.

When the to-be-processed data packet is an uplink data packet received on the wireless access point side, the to-be-processed data packet is a data packet that has been processed on the wireless access control MAC layer, and the target layer indicated by the protocol-stack layer jump processing policy is the IP layer or an APP layer, and the processing unit is specifically configured to:

when the to-be-processed data packet is the uplink data packet that has been processed on the MAC layer and that is received on the wireless access point side, and when the target layer indicated by the protocol-stack layer jump processing policy is the IP layer, sequentially jump the RLC layer and PDCP layer, and send the to-be-processed data packet in an IP manner; or when the to-be-processed data packet is the uplink data packet that has been processed on the MAC layer and that is received on the wireless access point side, and the target layer indicated by the protocol-stack layer jump processing policy is the APP layer, sequentially jump the RLC layer and PDCP layer, and add a UDP packet header and an IP packet header to the to-be-processed data packet and then send the packet, or add a TCP packet header and an IP packet header to the to-be-processed data packet and then send the packet; or sequentially jump the RLC layer and PDCP layer, and send the to-be-processed data packet to another network element, so that the another network element adds a UDP packet header and an IP packet header to the to-be-processed data packet and then sends the packet, or the another network element adds a TCP packet header and an IP packet header to the to-be-processed data packet and then sends the packet.

The second processing unit 34 is configured to: when the rule matching table does not include the identifier, process, without jumping protocol-stack layers, the to-be-processed data packet according to all protocol-stack layers of the wireless access point.

Figure 14:
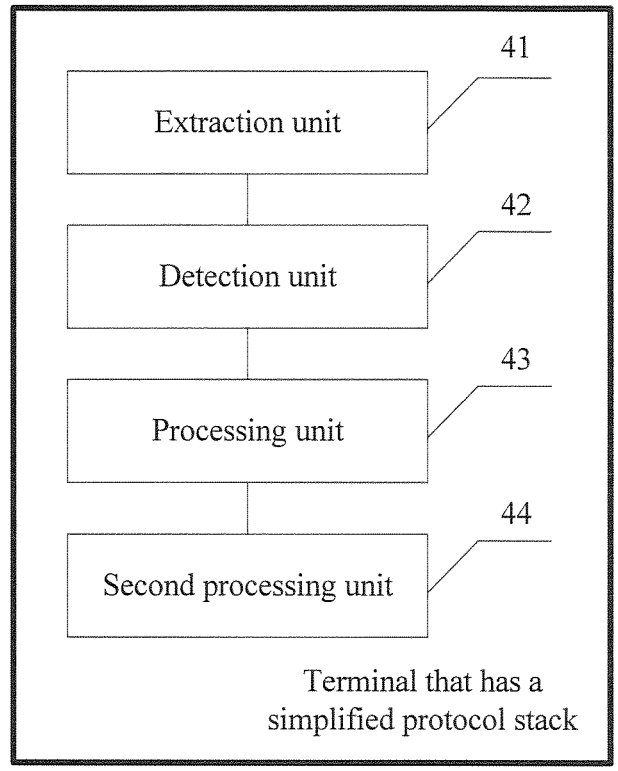
FIG. 14 is a structural diagram of Embodiment 4 of an apparatus for processing network protocol stack data according to the present application.

To better understand the technical solutions in the embodiments of the present disclosure, refer to FIG. 14. FIG. 14 is a structural diagram of Embodiment 4 of an apparatus for processing network protocol stack data according to the present application. The apparatus may be a terminal that has a simplified protocol stack, where the simplified protocol stack includes an APP layer, a MAC layer, and a wireless access control PHY layer. As shown in FIG. 14, the apparatus may include: an extraction unit 41, a detection unit 42, a processing unit 43, and a second processing unit 44.

The extraction unit 41 is configured to extract, from a to-be-processed data packet, an identifier used to indicate a data flow to which the to-be-processed data packet belongs.

The detection unit 42 is configured to detect whether a pre-generated rule matching table includes the identifier.

The processing unit 43 is configured to: when the rule matching table includes the identifier, process, according to a protocol-stack layer jump processing policy that is corresponding to the identifier and that is in the rule matching table, the to-be-processed data packet on a target layer indicated by the protocol-stack layer jump processing policy.

The processing unit 43 is specifically configured to:

put the to-be-processed data packet into a queue of the MAC layer when the to-be-processed data packet is an uplink data packet that has been processed on the APP layer and that is to be transmitted on a terminal side; or put the to-be-processed data packet into a queue of the APP layer when the to-be-processed data packet is a downlink data packet that has been processed on the MAC layer and that is received on a terminal side.

The second processing unit 44 is configured to: when the rule matching table does not include the identifier, process, without jumping protocol-stack layers, the to-be-processed data packet according to all protocol-stack layers of the terminal.

It should be noted that implementation of specific functions of the foregoing units in the apparatus embodiment has been described in detail in the method embodiments; for specific description, refer to related description in the method embodiments, and details are not described in this embodiment again.

In addition, an embodiment of the present application further provides a computing node, where the computing node may be a host server that has a computing capability, a personal computer PC, a portable computer or terminal, or the like. A specific embodiment of the present application constitutes no limitation on specific implementation of the computing node.

Figure 15:
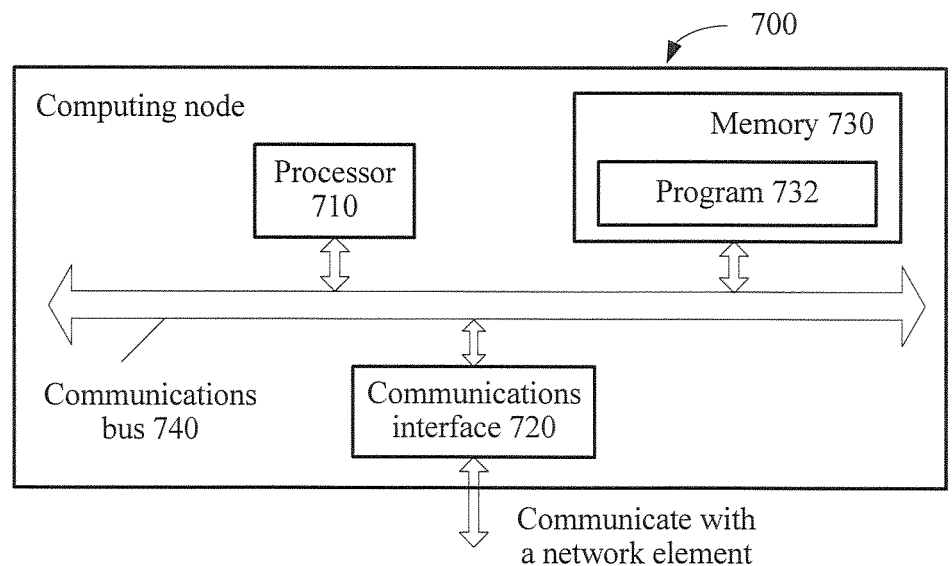
FIG. 15 is a structural diagram of a computing node according to the present application.

FIG. 15 is a structural diagram of a computing node according to the present application. The computing node may execute the methods for processing network protocol stack data disclosed in the method embodiments 1 to 6. As shown in FIG. 15, the computing node 700 includes:

a processor (processor) 710, a communications interface (Communications Interface) 720, a memory (memory) 730, and a bus 740.

The processor 710, the communications interface 720, and the memory 730 complete mutual communication by using the bus 740.

The processor 710 is configured to execute a program 732.

Specifically, the program 732 may include program code, where the program code includes a computer operation instruction. The instruction is used to indicate completion of a method for processing network protocol stack data disclosed in any embodiment in the method embodiments 1 to 6.

The processor 710 may be a central processing unit CPU, or an application specific integrated circuit ASIC (Application Specific Integrated Circuit), or one or more integrated circuits configured to implement this embodiment of the present application.

The memory 730 is configured to store the program 732. The memory 730 may include a high-speed RAM memory, and may further include a non-volatile memory (non-volatile memory), such as at least one disk memory.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

Persons of ordinary skill in the art may be aware that, in combination with the examples described in the embodiments disclosed in this specification, units and algorithm steps may be implemented by electronic hardware or a combination of computer software and electronic hardware. To clearly describe the interchangeability between the hardware and the software, the foregoing has generally described compositions and steps of each example according to functions. Whether the functions are performed by hardware or a combination of software and hardware depends on particular applications and design constraint conditions of the technical solutions. Persons skilled in the art may use different methods to implement the described functions for each particular application, but it should not be considered that the implementation goes beyond the scope of the present disclosure.

In combination with the embodiments disclosed in this specification, method or algorithm steps may be directly implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

The embodiments disclosed are described in the foregoing to enable persons skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A method for processing network protocol stack data, the method comprising:

receiving, from a network element, a to-be-processed data packet;

extracting, from the to-be-processed data packet, an identifier used to indicate a data flow to which the to-be-processed data packet belongs;

detecting whether a pre-generated rule matching table comprises the identifier;

when the rule matching table comprises the identifier, processing, according to a protocol-stack layer jump processing policy that is corresponding to the identifier and that is in the rule matching table, the to-be-processed data packet on a target layer indicated by the protocol-stack layer jump processing policy; and wherein:

when the to-be-processed data packet is the uplink data packet that has been processed on the MAC layer and that is received on the wireless access point side and when the target layer indicated by the protocol-stack layer jump processing policy is the IP layer, sending the to-be-processed data packet in an IP manner to another network element; or when the to-be-processed data packet is the uplink data packet that has been processed on the MAC layer and that is received on the wireless access point side and when the target layer indicated by the protocol-stack layer jump processing policy is the APP layer:
adding a UDP packet header or a TCP packet header and an IP packet header to the to-be-processed data packet and then sending a packet to another network element, or
sending the to-be-processed data packet to another network element, so that the another network element adds a UDP packet header and an IP packet header to the to-be-processed data packet and then sends the packet.

2. The method according to claim 1, wherein:
when the to-be-processed data packet is an uplink data packet to be transmitted on a terminal side, the to-be-processed data packet is a data packet that has been processed on an internet protocol (IP) layer or an application (APP) layer, and the target layer indicated by the protocol-stack layer jump processing policy is a medium access control (MAC) layer; or
when the to-be-processed data packet is a downlink data packet to be transmitted on a wireless access point side, the to-be-processed data packet is a data packet that has been processed on an internet protocol (IP) layer, and the target layer indicated by the protocol-stack layer jump processing policy is a medium access control (MAC) layer.

3. The method according to claim 2, wherein:
the to-be-processed data packet is the uplink data packet that has been processed on the IP layer and that is to be transmitted on the terminal side; or
the to-be-processed data packet is the uplink data packet that has been processed on the APP layer and that is to be transmitted on the terminal side; or
the to-be-processed data packet is the downlink data packet that has been processed on the IP layer and that is to be transmitted on the wireless access point side, wherein the downlink data packet that has been processed on the IP layer is a downlink data packet whose IP packet header and UDP packet header are not removed, or a downlink data packet whose IP packet header and TCP packet header are not removed, or a downlink data packet whose IP packet header and UDP packet header have been removed, or a downlink data packet whose IP packet header and TCP packet header have been removed.

4. The method according to claim 3, wherein the downlink data packet whose IP packet header and UDP packet header have been removed or the downlink data packet whose IP packet header and TCP packet header have been removed is obtained in the following manner:
receiving, on the wireless access point side, the downlink data packet whose IP packet header and UDP packet header are not removed, or the downlink data packet whose IP packet header and TCP packet header are not removed, and then removing, according to an indication of the protocol-stack layer jump processing policy that is corresponding to the identifier and that is in the rule matching table, the IP packet header and the UDP packet header of the downlink data packet, or the IP packet header and the TCP packet header of the downlink data packet, so as to obtain the downlink data packet whose IP packet header and UDP packet header have been removed or the downlink data packet whose IP packet header and TCP packet header have been removed; or
directly receiving, on the wireless access point side, the downlink data packet whose IP packet header and UDP packet header have been removed by another network element, or directly receiving, on the wireless access point side, the downlink data packet whose IP packet header and TCP packet header have been removed by another network element.

5. The method according to claim 1, wherein when the rule matching table comprises the identifier, processing, according to a protocol-stack layer jump processing policy that is corresponding to the identifier and that is in the rule matching table, the to-be-processed data packet on a target layer indicated by the protocol-stack layer jump processing policy comprises:
putting the to-be-processed data packet into a queue of the IP layer when the to-be-processed data packet is the downlink data packet that has been processed on the MAC layer and that is received on the terminal side and when the target layer indicated by the protocol-stack layer jump processing policy is the IP layer; or
putting the to-be-processed data packet into a queue of the APP layer when the to-be-processed data packet is the downlink data packet that has been processed on the MAC layer and that is received on the terminal side and when the target layer indicated by the protocol-stack layer jump processing policy is the APP layer.

6. The method according to claim 1, wherein the rule matching table is pre-generated in the following manner:
receiving the identifier used to indicate the data flow to which the to-be-processed data packet belongs and the protocol-stack layer jump processing policy corresponding to the identifier, wherein the identifier and the protocol-stack layer jump processing policy are sent by a centralized controller; and
generating the rule matching table according to the identifier and the protocol-stack layer jump processing policy corresponding to the identifier, wherein the rule matching table comprises an identifier field and a protocol-stack layer jump processing policy field, the identifier field comprises the identifier used to indicate a data flow to which the to-be-processed data packet belongs, and the protocol-stack layer jump processing policy field comprises the protocol-stack layer jump processing policy corresponding to the identifier.

7. The method according to claim 1, wherein the rule matching table is pre-generated in the following manner:
receiving the rule matching table sent by a centralized controller, wherein the rule matching table comprises an identifier field and a protocol-stack layer jump processing policy field, the identifier field comprises the identifier used to indicate a data flow to which the to-be-processed data packet belongs, and the protocol-stack layer jump processing policy field comprises the protocol-stack layer jump processing policy corresponding to the identifier.

8. The method according to claim 1, wherein the identifier used to indicate a data flow to which the to-be-processed data packet belongs is any one or any combination of multiple identifiers of the following: a radio bearer identifier, a tunnel endpoint identifier on a general data transfer platform, an IP 5-tuple, and a logical channel identifier, wherein the IP 5-tuple comprises a source IP address, a source port, a destination IP address, a destination port, and a transmission layer protocol number.

9. The method according to claim 1, wherein the method is applied to a terminal side or a wireless access point side having a simplified protocol stack comprising an application (APP) layer, a medium access control (MAC) layer, and a wireless access control physical (PHY) layer.

10. A wireless access point for processing network protocol stack data, the wireless access point comprising: a processor, a communications interface, a memory and a bus;
the communications interface is configured to receive, from a network element, a to-be-processed data packet;
the processor is configured to:
extract, from a to-be-processed data packet, an identifier used to indicate a data flow to which the to-be-processed data packet belongs;
detect whether a pre-generated rule matching table comprises the identifier; and
when the rule matching table comprises the identifier, process, according to a protocol-stack layer jump processing policy that is corresponding to the identifier and that is in the rule matching table, the to-be-processed data packet on a target layer indicated by the protocol-stack layer jump processing policy;
when the to-be-processed data packet is the uplink data packet that has been processed on the MAC layer and that is received on the wireless access point side and when the target layer indicated by the protocol-stack layer jump processing policy is the IP layer, send to-be-processed data packet in an IP manner through the communications interface to another network element; or
when the to-be-processed data packet is the uplink data packet that has been processed on the MAC layer and that is received on the wireless access point side and when the target layer indicated by the protocol-stack layer jump processing policy is the APP layer, add a UDP packet header or a TCP packet header, and an IP packet header to the to-be-processed data packet and then send a packet through the communications interface to another network element, or
send the to-be-processed data packet through the communications interface to another network element, so that the another network element adds a UDP packet header and an IP packet header to the to-be-processed data packet and then sends the packet.

11. The wireless access point according to claim 10, wherein:
when the to-be-processed data packet is a downlink data packet to be transmitted on a wireless access point side, the to-be-processed data packet is a data packet that has been processed on an internet protocol (IP) layer, and the target layer indicated by the protocol-stack layer jump processing policy is a medium access control (MAC) layer, and the processor is configured to:
put the to-be-processed data packet into a queue of the MAC layer when the to-be-processed data packet is the downlink data packet that has been processed on the IP layer and that is to be transmitted on the wireless access point side, wherein the downlink data packet that has been processed on the IP layer is a downlink data packet whose IP packet header and UDP packet header are not removed, or a downlink data packet whose IP packet header and TCP packet header are not removed, or a downlink data packet whose IP packet header and UDP packet header have been removed, or a downlink data packet whose IP packet header and TCP packet header have been removed; and
wherein the downlink data packet whose IP packet header and UDP packet header have been removed or the downlink data packet whose IP packet header and TCP packet header have been removed is obtained in the following manner:
receiving, on the wireless access point side, the downlink data packet whose IP packet header and UDP packet header are not removed, or the downlink data packet whose IP packet header and TCP packet header are not removed, and then removing, according to an indication of the protocol-stack layer jump processing policy that is corresponding to the identifier and that is in the rule matching table, the IP packet header and the UDP packet header of the downlink data packet, or the IP packet header and the TCP packet header of the downlink data packet, so as to obtain the downlink data packet whose IP packet header and UDP packet header have been removed or the downlink data packet whose IP packet header and TCP packet header have been removed, or
directly receiving, on the wireless access point side, the downlink data packet whose IP packet header and UDP packet header have been removed by another network element, or directly receiving, on the wireless access point side, the downlink data packet whose IP packet header and TCP packet header have been removed by another network element.

12. The wireless access point according to claim 10, wherein the wireless access point for processing network protocol stack data has a simplified protocol stack comprising an application (APP) layer, a medium access control (MAC) layer, and a wireless access control physical (PHY) layer.

13. The wireless access point according to claim 10, wherein the rule matching table is pre-generated in the following manner:
receiving the identifier used to indicate the data flow to which the to-be-processed data packet belongs and the protocol-stack layer jump processing policy corresponding to the identifier, wherein the identifier and the protocol-stack layer jump processing policy are sent by a centralized controller; and
generating the rule matching table according to the identifier and the protocol-stack layer jump processing policy corresponding to the identifier, wherein the rule matching table comprises an identifier field and a protocol-stack layer jump processing policy field, the identifier field comprises the identifier used to indicate a data flow to which the to-be-processed data packet belongs, and the protocol-stack layer jump processing policy field comprises the protocol-stack layer jump processing policy corresponding to the identifier;
or,
receiving the rule matching table sent by a centralized controller, wherein the rule matching table comprises an identifier field and a protocol-stack layer jump processing policy field, the identifier field comprises the identifier used to indicate a data flow to which the to-be-processed data packet belongs, and the protocol-stack layer jump processing policy field comprises the protocol-stack layer jump processing policy corresponding to the identifier.

14. The wireless access point according to claim 10, wherein the identifier used to indicate a data flow to which the to-be-processed data packet belongs is any one or any combination of multiple identifiers of the following: a radio bearer identifier, a tunnel endpoint identifier on a general data transfer platform, an IP 5-tuple, and a logical channel identifier, wherein the IP 5-tuple comprises a source IP address, a source port, a destination IP address, a destination port, and a transmission layer protocol number.

\* \* \* \* \*